Sept. 16, 1969     I. N. DULING ET AL     3,467,627
ADAMANTANE POLYESTERS
Filed Oct. 14, 1966
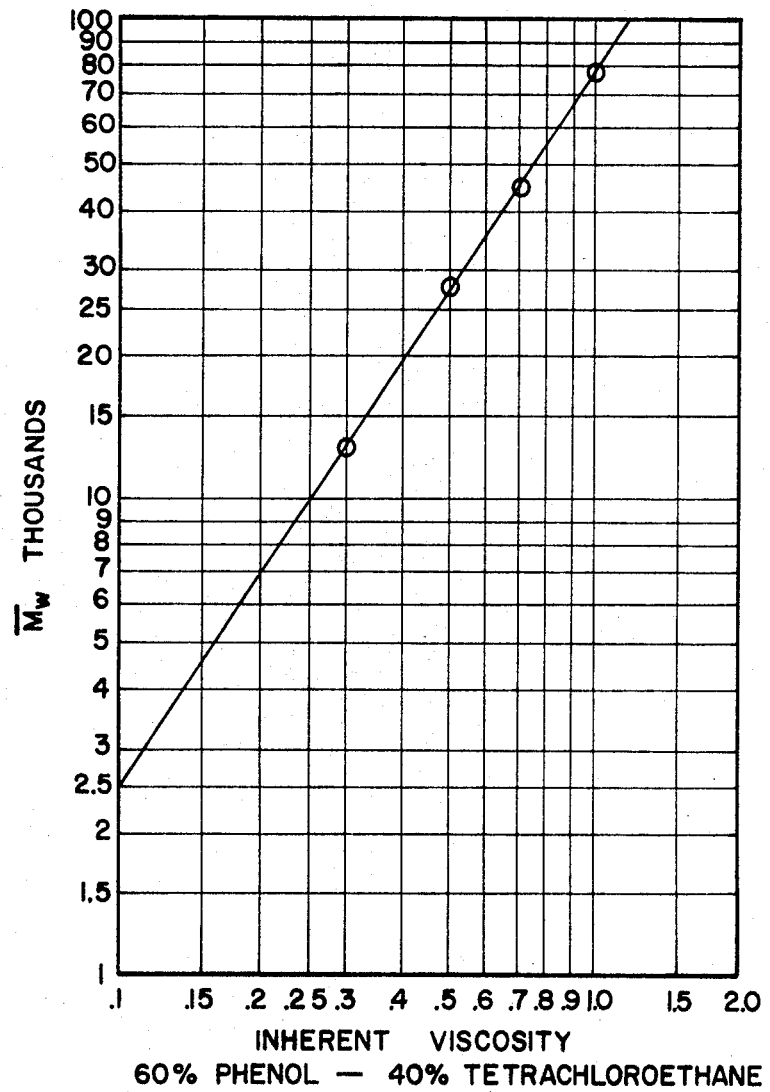
INHERENT VISCOSITY
60% PHENOL — 40% TETRACHLOROETHANE
INVENTORS.
IRL N. DULING, ABRAHAM SCHNEIDER,
GARY L. DRISCOLL
BY
Donald R. Johnson
ATTORNEY

United States Patent Office 3,467,627
Patented Sept. 16, 1969

3,467,627
ADAMANTANE POLYESTERS
Irl N. Duling, West Chester, Abraham Schneider, Overbrook Hills, and Gary L. Driscoll, Boothwyn, Pa., assignors to Sun Oil Company, Philadelphia, Pa., a corporation of New Jersey
Filed Oct. 14, 1966, Ser. No. 586,825
Int. Cl. C08g *17/08, 22/10*
U.S. Cl. 260—75
18 Claims

ABSTRACT OF THE DISCLOSURE

Linear polyesters having a good temperature, hydrolitic and ultraviolet stability are prepared from hydrocarbon substituted adamantane diols and organic diacids. The hydroxyl groups are at bridgehead positions in the adamantane molecule and preferably the admanatane molecule contains substituents at the remaining bridgehead positions thus removing all tertiary hydrogen atoms therefrom. Some of the polyesters are noncrystalline and are useful as coatings for paper to provide waterproof barriers or strippable coatings. Other polyesters particularly those prepared with aromatic diacids have a high degree of crystallinity and are suitable for producing films and fibers said polyesters can be reacted with diisocyanates to produce products useful as films, coating, and insulating foams.

BACKGROUND

Adamantane (tricyclo-[3.3.1.1$^{3,7}$] decane) has a carbon structure containing ten carbon atoms arranged in a completely symmetrical, strainless manner, wherein four of the carbon atoms are in bridgehead positions in the rings. The typographical structure of adamantane is often reprensented as:

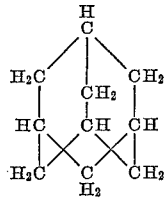

There are four tertiary hydrogen atoms, one at each bridgehead carbon atom. All four bridgehead carbon atoms are equivalent to each other and likewise all rings are equivalent.

The preparation and use of monoesters of 1-adamantane carboxylic acid is taught in the prior art by Spengler et al., Erdol und Kohle-Erdgas-Petrochemie, vol. 15, pages ¯02–707 (September 1962).

The preparation and use of monoesters of admantane-1-ol is taught in U.S. Patent 3,081,337.

The preparation and use of diesters containing an adamantane nucleus is shown in U.S. 3,398,165 issued Aug. 20, 1968.

A polyester produced from the dimethyl ester of 1,3-adamantane diacid and 1,4-bicyclo (2.2.2) octane dimethanol is shown in French Patent 1,374,693.

The figure is a graph relating inherent viscosity ($\eta$ inh.) with weight average molecular weights.

DESCRIPTION OF THE INVENTION

The present invention relates to linear polyesters produced from the substituted adamantane diols said polyesters having superior properties in regard to stability at high temperatures, hydrolytic stability and ultraviolet stability over linear polyesters produced from adamantane diacids.

The novel linear polyesters of the present invention are comprised of a substituted adamantane diol wherein the substituent is a hydrocarbon radical and an organic diacid component. The polymers may be described as linear polyesters comprising a substituted adamantane diol having the structure

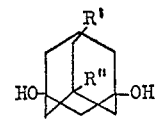

where R' is a radical having 0 to 20 carbon atoms selected from the group consisting of hydrogen and hydrocarbyl and R" is a hydrocarbyl radical having 1 to 20 carbon atoms and an organic diacid component selected from the group consisting of a diacid having the structure

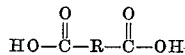

and a mixture of diacids having the structure

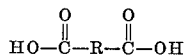

where R is a bivalent organic radical.
The preferable polyesters according to the present invention comprise a hydrocarbon substituted adamantane diol having the structure

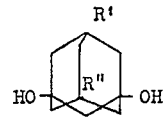

where R' is a radical having 0 to 20 carbon atoms selected from the group consisting of hydrogen, alkyl, cycloalkyl, and aryl and R" is a radical having 1 to 20 carbon atoms selected from the group consisting of alkyl, cycloalkyl and aryl and an organic diacid component selected from the group consisting of a diacid having the structure

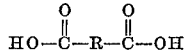

and a mixture of diacids having the structure

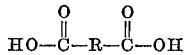

where R is a bivalent organic radical. A preferred R is a radical having 1 to 20 carbon atoms selected from the group consisting of alkylene, cycloalkylene and arylene.

The term hydrocarbyl is used to designate a hydrocarbon radical which can be from the group alkyl, cycloalkyl, aryl, alkaryl, aralkyl, alkcycloalkyl, cycloalkalkyl, cycloalkaryl, arcycloalkyl and any combination of hydrocarbon radicals. Some examples of the above radicals are methyl-, cyclohexyl-, phenyl-, benzyl-, tolyl-, methylhexyl-, hexyl-ethyl-, cyclo- propyl-phenyl-, phenyl-cyclohexyl-, and the like. The above hydrocarbyl radicals are attached at either the 1 or 3 postitions or both on the adamantane molecule.

The adamantane starting material used to produce the polyesters of the present invention is a bridgehead mono- or dialkylated or arylated adamantane having the general formula

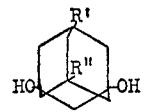

where R' and R" have the significance previously given.
The alkyl- or cycloalkyl-adamantane compounds can be produced according to the method disclosed by Schneider et al., Journal of the American Chemical Society, volume 86, pages 5365–5367. The arylated adamantane compounds can be produced by reacting a bromo-adamantane with an excess of the aromatic compound in a procedure such as that shown by Stetter et al., Ber.; 97 (12) 3488–92 (1964).

The substituted adamantanes for the present invention can have either non-branched or branched alkyl groups and can have one or more cycloalkyl or aryl radicals in the substituted adamantane moiety with a total number of carbon atoms in each R group ranging up to 20. The diols of the alkylated adamantanes can be produced by reacting the parent hydrocarbon with chromic acid according to the procedure disclosed in U.S. 3,383,424, issued May 14, 1968. This procedure will also produce the diols of the arylated adamantanes.

Examples of suitable adamantyl diols are the 5,7-dihydroxy derivatives of the following hydrocarbons: 1-methyladamantane; or 1-ethyladamantane; 1,3-dimethyladamantane; 1 - methyl - 3-ethyladamantane; 1,3-diethyladamantane; 1-n-propyl or 1-isopropyladamantane; 1-n-butyladamantane; 1,3-di-n-pentyladamantane; 1-methyl-3-heptyladamantane; 1-n-decyladamantane; 1-n-decyl-3-ethyladamantane; 1 - methyl - 3-propyladamantane; 1-isohexyladamantane; 1-methyl-3-cyclohexyladamantane; 1-phenyladamantane; 1-methyl-3-phenyladamantane; 1,3-phenyladamantane and the like.

In regard to the structures given above, it should be noted that of the substituents specified at the bridgehead positions of the adamantane moiety only R' may be a hydrogen atom. Thus, in any composition according to the invention, there will at most be only one tertiary hydrogen atom in each adamantane moiety. Preferred compositions have no tertiary hydrogen atom in the adamantane moiety, thus in preferred compositions R' will be either an alkyl, cycloalkyl or aryl group. More preferably because of the ease with which they may be obtained, the bridgehead substituents will be methyl or ethyl groups or both.

The linear polyesters are produced by the condensation of substituted adamantane diol as described above with an organic diacid or a mixture of organic diacids, esters or halide thereof depending on the method of preparation.

The organic diacid is characterized by the formula

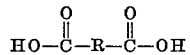

wherein R, the bivalent radical can be selected from the following groups: aromatic, aliphatic, cycloaliphatic, combination of aromatic and aliphatic, heterocyclic, bridged organic radicals wherein the bridge is oxygen, nitrogen or sulfur and substituted groups thereof. Such substituents include halogen, amino, methoxy, sulfide and the like provided that such substituents do not interfere with the polyesterification. The preferred R group is a radical having 1 to 20 carbon atoms selected from the group consisting of alkylene, cycloalkylene and arylene. No ethylenic unsaturation is present in the R radical.

In carrying out the esterificaitons, the diacids

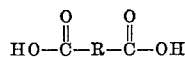

will usually be employed in the diester or diacyl form as pointed out below. The organic diacid can be, for example, the acid form, the dimethyl and diethyl esters, the dioyl chlorides or the anhydrides of the following acids: adipic; pimelic; suberic; azelaic; sebacic; undecandedioic; dodecanedioic; malonic; succinic; glutaric; cyclopentane dicarboxylic; cyclohexane dicarboxylic; decalin dicarboxylic; orthophthalic; isophthalic; terephthalic; 1,2,2 - trimethyl - 1,3 - cyclopentane dicarboxylic; bromopropanedioic; 3 - methyl - 1,1-butanedicarboxylic; mesoxalic; 4,6 - dimethylisophthalic; 1 - glutamic; 2,6-naphthalene dicarboxylic; o,o' - azobenzenedicarboxylic; p,p' - azobenzenedicarboxylic; o,o' - azoxydibenzoic; p,p'-benzophenone dicarboxylic; 2,3 - dihydroterephthalic; 1-3,3' - dithiobis(2 - amino - propanoic); 2,5 - furandicarboxylic; oxydiethanoic; 3,5 - pyridinedicarboxylic; α-2-toluenedicarboxylic; tetrachloro phthalic; quinolinic; α-amino-succinic; tartronic; benzyl-tartronic; 2,3-thiophenedicarboxylic; isohemipinic and the like.

The selection of a particular diacid component and the mole ratio to be employed will depend on the desired properties of the final polyester.

The mixture of diacids can for example be a mixture of an aliphatic, a cycloaliphatic and an aromatic diacid; it can be a mixture of acids within one class such as adipic and sebacic or a mixture of diacids from two or more classes such as adipic, sebacic and terephthalic acids.

Any proportion of mixed acids may be employed. For example, the acid reactant can contain 1% (mole) of an aromatic diacid and 99% (mole) of an aliphatic diacid.

Some preferred acid combinations are: terephthalic-adipic; adipic - succinic; succinic-malonic; terephthalic-adipic-malonic and terephthalic-adipic-glutaric.

Polyesters produced from aliphatic diacids were found to be amorphous (essentially non-crystalline). Both annealing and precipitation from solution were tried on several samples without developing any crystallinity detectable by X-ray analysis.

The aromatic polyesters do not show a tendency to crystallize from melt polymerization; however, in solution polymerization and in precipitation from solvents during the workup of the polyesters, they crystallize fairly readily on the order of about 30% as determined by X-ray scan.

In carrying out the esterifications, stoichiometric proportions of the reactant can be used. Generally a molar ratio of acid reactant to the dihydroxy alkyladamantane reactant in the range of 0.95:1.0 to 1.0:1.10 will be used in carrying out the reactions.

The linear polyesters according to the present invention have an inherent viscosity ($\eta$inh.) in the range of .05 to 2.0.

$$\eta_{\text{inherent}} = \ln \frac{\eta_{\text{relative}}}{C}$$

where:

$\eta_{\text{relative}} = t/t_0$ $t_0$ = flow time through a viscometer of a liquid reference.

$t$ = flow time through the same viscometer of a dilute solution of polymer in the reference liquid.

$C$ = concentration of polymer in solution expressed in grams/deciliter.

The solvent employed was 60% phenol, 40% tetrachloroethylene. Concentration was .50±.05 gram per/dl. Where the polymer was soluble in benzene the number average molecular weight ($\overline{M}_N$) was measured directly in a Mechrolab Osmometer. It is, however, difficult to measure the average molecular weight of all of the polyesters particularly those containing an aromatic nucleus because of their limited solubility in suitable solvents. For this reason, the inherent viscosity was employed to characterize these polymers. The inherent viscosity is indicative of the degree of polymerization and is used herein as measure thereof. By analogy with the known inherent viscosity and weight average molecular weight ($\overline{M}_W$) relationship of "Dacron" it is possible to estimate from the inherent vicosities of the instant polyesters that the number average molecular weight of thet linear polyesters of the present invention is in the range of 900 to 60,000 ($\overline{M}_N = \overline{M}_{W/2}$). Where $\overline{M}_N$ was determined directly and also determined by analogy from inherent viscosity in regard to "Dacron" it was found that the values agreed with ±10% for the lower values and ±20% for the high values which is within the estimated accuracy of the Mechrolab Osmometer. This agreement of estimated and measured molecular weight is considered valid for the polyester produced from the aliphatic acids, however, no attempt has been made to relate the inherent viscosity to molecular weight for the polyesters produced from aromatic diacids. The figure shows the relationship between the inherent viscosity and weight average molecular weight, $\overline{M}_W$, for "Dacron."[1]

The linear polyesters of the present invention, depending on their degree of polymerization are viscous liquids to solids. Those compositions which are viscous liquids have particular utility as lubricants or as components in lubricating and grease compositions because of their stability. The liquid polyesters can also be used as plasticizers for solid polymers of the present invention, wherein they have excellent compatibility and as plasticizers generally for polymeric materials. The solid polyesters of the type described above may be used to produce films.

The films produced by the condensation of alkyladamantane diols and aliphatic acids are non-crystalline and essentially amorphous, thus have utility as coating for paper in order to produce moisture-impervious barriers or as strippable coatings, for example as a protective coating for metal parts prior to use.

Where the acid portion of the polyesters is 70 to 100% aromatic, the polymers have a high degree of crystallinity and are suitable for producing films and fibers.

It is possible to increase the length of the linear polyester chains by using a suitable coupling agent, for example, toluene diisocyanate. The coupling can take place at either the terminal alcohol or acid sites on the polyesters. The mechanism of the coupling at the acid site for the isocyanate can be represented by:

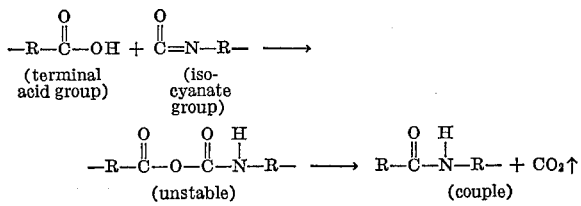

The mechanism of the coupling at the alcohol site for the isocyanate can be represented by:

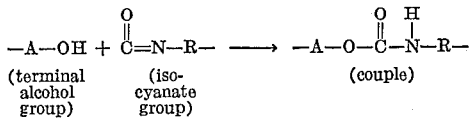

where A is the adamantane nucleus and R is as previously indicated. Other suitable coupling agents include diacyl chlorides, glycols, diamines and the like. The selection of the proper coupling agent is made on the basis of the terminal polyester groups which can be determined from the original stoichiometry. The resulting coupled linear polyesters are linear and have essentialy the same properties as linear polyesters having corresponding polymer chain length. The coupled linear polyesters have inherent viscosities in the range of .20 to 2.0.

Normally coupling would be employed in the case of short chain polyesters in order to increase the apparent degree of polymerization for these polyesters without substantial change in the polyester properties.

The polyesters of the present invention have high stability against thermal and oxidative degradation and good hydrolytic stability. The polyesters of the present invention are the reverse of the polyester described in the prior art referred to above. In other words, the adamantane nucleus (A) is attached to an oxygen atom of the carboxylic group in this fashion,

[1] Moore, Am. Chem. Soc., Poly. Div., Preprint 1 (#1) 234–43 (1960).

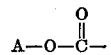

rather than to the carbon atom in the following linkage,

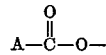

The present structural arrangement,

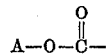

resulting from the adamantane derived reactant being an alcohol instead of an acid, imparts greater stability to the polyester product of the invention as compared to that shown in the prior art.

A well-known decomposition route for conventional types of esters depends upon their ability, under appropriate conditions, to transfer a hydrogen atom from the beta positon of the alcohol derived moiety in the following manner:

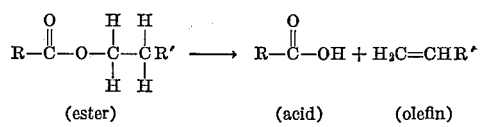

This decompositon results as shown in the conversion of the ester into an acid and an olefin. The present esters cannot undergo this decomposition as this would require the formation of a double bond in the adamantane nucleus which will not occur. The decomposition cannot occur because the carbon atom in the adamantane nucleus through which the ester bond is made is a quaternary carbon atom.

Another reason for the overall stability of the present polyesters as compared to the prior art polyesters made from 1,3-adamantane dicarboxylic acid is the fact that the present polyesters have at most only one tertiary hydrogen atom attached at each adamantane moiety and preferably have no tertiary hydrogen atoms. In comparison, a polyester of the prior art has two bridgehead tertiary hydrogen sites on each adamantane moiety. These are active sites constituting spots in the molecule where oxidation and peroxide formation can occur.

Another reason for the superior stability of the present polyesters is that the ester structure represented by

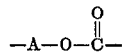

will be less likely to undergo hydrolysis under nonacidic conditions than the reverse structure

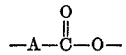

This is an important property for the polyester since they may be expected to come into contact with water when utilized as described.

Preparation of linear polyesters using the bridgehead alkyladamantane diols is not as readily accomplished as when aliphatic glycols are employed. Attachment of the hydroxyl group at the bridgehead carbon of the adamantane nucleus makes the group relatively inactive. Hence, many of the known methods of producing polyesters may not be suitable for making the products of the present invention. For example, conventional copolymerization of the 1,3-diol with an aromatic diacid by means of an acidic catalyst generally is not a suitable way of preparing the polyester.

Several suitable procedures, however, have been found. These include transesterification, melt polymerization using anhydrides, melt polymerization using acyl chlorides, inert solution polymerization and pyridine solution polymerization. These procedures will be set forth in detail in the examples.

The crude reaction product can be worked up in the usual manner for polyesters. For example, the crude polyester can be dissolved in a solvent such as benzene or toluene and precipitated by addition to cold methanol. This procedure can be repeated four or five times to obtain a pure product.

The examples presented herein are intended to be merely illustrative and are not intended to limit the scope of the claims. Certain ratios of reactants have been specified. It is to be understood that those of skill in the art will be able to select the respective proportion from each range so as to produce compositions within the spirit and scope of the invention as disclosed. The examples provide guidelines to indicate to those of skill in the art the means and manner of reactant selection, procedures for utilizing the reactants, and the general nature of the polyesters to be obtained.

POLYESTERS PRODUCED FROM ALIPHATIC DIACIDS

Example I.—Melt transesterification 1,3 - dihydroxy - 5,7 - dimethyladamantane (3.00 g.=.0153 mole) diethylmalonate (2.45 g.=.0153 mole) and tetraisopropyltitanate (.25 ml.) were placed in a polymerization tube at room temperature. A slow stream of nitrogen was bubbled through the mixture as the temperature was raised to 195° C. over a period of one hour. The theoretical amount of ethanol (1.8 ml.) was collected within three hours. The mixture was heated an additional six hours under vacuum (.25 mm. Hg) at 195° C. and one and one-half hours at 220° C. The viscous brown mixture was allowed to cool. A brittle clear polymer resulted. This was ground to a powder. It melted to a yellow oil at 73–82°. When dissolved in benzene-acetone mixtures and the solution partially evaporated, a solid was obtained which did not melt at 310° C. The number average molecular weight (Mechrolab Osmometer) was 1616 and the glass transition (by DTA) occurred at 99° C. By I.R. the polyester was seen to be predominantly hydroxyl terminated.

Example II.—Melt polymerization using anhydride 1,3 - dihydroxy - 5,7 - dimethyladamantane (3.00 g.=.0153 mole), glutaric anhydride (1.74 g.=.0153 mole), and a trace of p-toluene sulfonic acid were placed in a polymerization tube and heated to 190° C. under nitrogen. After four hours, a vacuum was pulled on the system. The temperature was increased to 250° C. and the reaction run 25 hours. The melt was brown and appreciably viscous. The polyesters set to a glass on cooling (Tg=51° C. by DTA; $\eta_{inh.}$=.25; $\bar{M}_N$=4430, Mechrolab Osmometer in benzene solution).

Example III.—Melt polymerization using acyl chlorides 1,3-dihydroxy-5,7-dimethyladamantane (8.43 g.=.043 mole) and adipoyl chloride (7.86 g.=.043 mole) were mixed and heated cautiously. Evolution of HCl was fairly rapid as the mixture was gradually heated to 150° C. for 2½ hours. A yellow-brown color developed. Traces of HCl evolution could still be detected over the viscous melt. Cooling to room temperature gave a very viscous liquid polyester ($\eta_{inh.}$=.08; Tg=12° C.).

Example IV.—Solution polymerization using acyl chlorides

Adipoyl chloride (2.80 g.=.0153 mole), 1,3-dihydroxy - 5,7-dimethyladamantane (3.00 g.=.0153 mole), and 70 ml. benzene were placed in a 100 ml. round bottom flask equipped with a reflux condenser and stirrer. The mixture was refluxed 43.5 hours and the solvent removed by freeze-drying. The product was a very viscous oil. The infrared spectrum was as expected for the polyester. The number average molecular weight was 1415 (Mechrolab Osmometer) and the inherent viscosity was .11.

The various polymerization reactions set out above were performed for various aliphatic diacid derivatives using approximately the same molar relationships. The results of these runs and of some of the examples above are set out in Table I.

POLYESTERS PRODUCED FROM AROMATIC DIACIDS

Example V.—Melt transesterification 5.00 grams (.0255 mole) of 1,3-dihydroxy-5,7-dimethyladamantane, 4.94 grams (.0255 mole) of dimethylterephthalate and .40 ml. of tetraisopropyltitanate catalyst were placed in a polymerization tube under a slow stream of nitrogen. The tube was immersed in a heating block maintained at 195–200° C. The melt was colorless. After approximately one hour, methanol started collecting in the cold receiver. After 2 hours about 50% of the theoretical amount of methanol had been collected.

TABLE I

| | $\eta_{inh.}$, dl./g. | $\bar{M}_N$ | $(\bar{M}_N)^{-1} \times 10^3$ | $\bar{M}_V{}^1$ | $(\bar{M}_V)^{-1} \times 10^3$ | Tg, °C. |
|---|---|---|---|---|---|---|
| Malonate, melt transesterification/diester | .09 | 1,620 | .618 | 1,100 | | 99 |
| Glutarate: | | | | | | |
|   Melt/anhydride | .25 | 4,430 | .226 | 5,000 | .200 | 51 |
|   Melt transesterification/diester | | 1,364 | | | | |
|   Melt/anhydride | .16 | 2,820 | .355 | 2,600 | .385 | 45 |
|   Melt/diester | .10 | | | 1,300 | | <28 |
| Adipate: | | | | | | |
|   Melt/acyl chloride | .08+ | | | 925+ | 1.08− | 12 |
|   Do | .08− | | | 925− | 1.08+ | 9 |
|   Solution/acyl chloride | .11 | 1,415 | .704 | 1,500 | .667 | −32 |
|   Do | .19 | 3,660 | .274 | 3,350 | .298 | 24 |
|   Melt transesterification/diester | .10 | 1,250 | .800 | 1,300 | .769 | 18.2 |
|   Do | .12 | | | 1,700 | .588 | 42.5 |
|   Do | .09 | ²1,480 | .675 | 1,100 | .908 | 20.6 |

¹ $\bar{M}_V$=number average molecular weight calculated from the equation $\bar{M}_V = \bar{M}_{W/2}$ where $\bar{M}_W$ is the weight average molecular weight. By referring to the figure, it is possible to determine $\bar{M}_W$ from the inherent viscosity. There is good agreement between the number average molecular weight determined directly ($\bar{M}_N$) and that calculated ($\bar{M}_V$).
² Probably high due to some insolubles in sample.

The temperature was increased to 250° C. After four additional hours about 100% of the theoretical amount of methanol had been collected and a vacuum was slowly pulled on the system. A full vacuum (less than .2 mm. Hg) was maintained for approximately four hours during which time the material became a non-flowing foam. The polymerization tube was cooled and broken to remove the solid polymer. After grinding, a brown powder having an inherent viscosity of .09 was obtained. Differential thermal analysis (TDA) showed a transition at 192–225° C. X-ray analysis showed about 30% crystallization after precipitation from benzene solution. The infrared spectrum was as expected for the polyester.

Example VI.—Inert solution polymerization 1,3 - dihydroxy - 5,7 - dimethyladamantane (3.00 g.=.0153 mole) and terephthaloyl chloride (recrystallized from n-hexane; melting point 81.8–82.6; 3.10 g.=.0153 mole) were refluxed with 50 ml. benzene under a nitrogen atmosphere. An infrared spectrum after 7 hours refluxing showed that little reaction had occurred. After 4 more hours of refluxing an aliquot spectrum showed a somewhat stronger ester band relative to the acyl halide band. The benzene was displaced by p-xylene to allow a higher reflux temperature (138° C.). After 186 hours of reflux, the polymer was isolated by redissolving in benzene and pouring the solution into methanol to reprecipitate it. The isolated yield was 3.8 g. (76% of theoretical). The polyester was estimated to be about 30% crystalline by X-ray analysis. DTA showed an apparent glass transition at about 165° C. ($\eta_{inh.}$=.09; $\overline{M}_N$=1490).

Example VII.—Pyridine solution polymerization 1,3 - dihydroxy - 5,7 - dimethyladamantane (5.88 g.=.030 mole), terephthaloyl chloride (6.09 g.=.030 mole), and reagent grade pyridine (250 ml.) were stirred in a 500 ml. flask under a nitrogen atmosphere. A yellow-orange color immediately developed and the solution became warm. The solution was refluxed 6 hours, allowed to stand at room temperature for 64 hours, then refluxed for a further 48 hours. A deep orange color developed during this time. The solution was poured into methanol and the polymer powder filtered out and dried ($\eta_{inh.}$=.10).

POLYMERIZATIONS USING MIXED DIACIDS

Example VIII.—Melt transesterification 1,3 - dihydroxy - 5,7 - dimethyladamantane (4.70 g.=.024 mole), dimethylterephthalate (3.20 g.=.0164 mole), dimethyladipate (.95 g.=.00547 mole), and a few drops of tetraisopropyltitanate catalyst were placed in a polymerization tube under a slow stream of nitrogen. The tube was immersed in a heating block maintained at 195–200° C. The melt was colorless. After approximately one hour, methanol started collecting in the cold receiver. After 18 hours, about 80% of the theoretical amount of methanol had been collected. The temperature was increased to 250° C. After 4 additional hours, about 90% of the theoretical amount of methanol had been collected and a vacuum was slowly pulled on the system. A full vacuum (less than .1 mm. Hg) was maintained for approximately 12 hours, during which time the material became a non-flowing foam (at 250° C.). The polymerization tube was cooled and broken to remove the solid copolymer. After grinding, an orange powder having an inherent viscosity of 0.11 was obtained. Differential thermal analysis (DTA) showed a glass transition at 150–160° C. The infrared spectrum was as expected for the interpolyester.

Example IX.—Coupling 2.00 g. of the interpolyester of Example VIII was dissolved in benzene and small portions of solution of toluene diisocyanate in benzene added to the refluxing solution over a period of three hours. By the end of this time a fairly large (50%) excess of isocyanate had been added. A small amount of gel which formed on standing overnight was removed by filtration. The copolymer was isolated by pouring the solution slowly into a stirred excess of methanol. The orange powder was filtered off and dried under a vacuum to give 1.2773 g. (about 61%) of the recovered copolymer. The inherent viscosity of this polymer was 0.21.

Example X.—Film casting

Benzene solutions of the polyester prepared in Examples V and VI (ca. 20% solids) were cast (10 mil thickness) on glass plates using a doctor blade. Most of the benzene was removed by a stream of air across the film at room temperature. The films were then heated to 100° C. and a vacuum applied for one hour. The resulting films were brittle but were clear and transparent.

We claim:
1. A linear polyester characterized as having a diol component and a dibasic component comprising the following structural unit

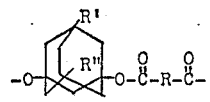

where R' and R" are radicals having 1 to 20 carbon atoms selected from the group consisting of alkyl, cycloalkyl and aryl and R is a bivalent organic radical selected from the group consisting of alkylene and arylene having 1 to 12 carbon atoms, provided R in each structural unit is independently selected, further provided the mole ratio of diol component to dibasic component is in the range of 0.95:1.0 to 1.0:1.10.

2. A linear polyester according to claim 1 wherein the R in each structural unit is the same.

3. A linear polyester according to claim 2 wherein R' is selected from the group consisting of methyl and ethyl and R" is selected from the group consisitng of methyl and ethyl.

4. A polyurethane composition comprising the linear polyester according to claim 2 and an organic diisocyanate.

5. A linear polyester according to claim 2 wherein R' and R" are methyl.

6. A linear polyester according to claim 5 wherein R is methylene.

7. A linear polyester according to claim 5 wherein R is trimethylene.

8. A linear polyester according to claim 5 wherein R is tetramethylene.

9. A linear polyester according to claim 5 wherein R is

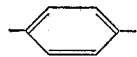

10. A polyester according to claim 1 having an inherent viscosity in the range of .05 to 2.0.

11. A polyester according to claim 1 wherein R' is selected from the group consisting of methyl and ethyl and R" is selected from the group consisting of methyl and ethyl.

12. A polyurethane composition comprising the polyester according to claim 1 and an organic diisocyanate.

13. A linear interpolyester according to claim 1 wherein there are at least two different R groups present in the structural units.

14. A linear interpolyester according to claim 13 wherein R' is selected from the group consisting of methyl and ethyl and R" is selected from the group consisting of methyl and ethyl.

15. A linear interpolyester according to claim 14 wherein R' and R" are methyl.

16. A linear interpolyester according to claim 15 wherein R is selected from the group consisting of

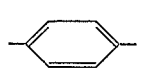

and tetramethylene.

17. A polyurethane composition comprising the linear interpolyester according to claim 13 and an organic diisocyanate.

18. A polyurethane composition comprising the linear interpolyester according to claim 17 and toluene diisocyanate wherein R' and R" are methyl and R is selected from the group consisting of
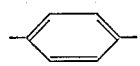
and tetramethylene.
References Cited
UNITED STATES PATENTS
| | | | |
|---|---|---|---|
| 2,753,319 | 7/1956 | Brockway | 260—30.6 |
| 2,933,478 | 4/1960 | Young et al. | 260—77.5 |
| 3,342,880 | 9/1967 | Reinhardt | 260—648 |
OTHER REFERENCES
Phillips and Parker: Polyurethane, Iliffe Books, Ltd., London (1964), page 91. Call No. TP1180P8P5.
DONALD E. CZAJA, Primary Examiner
H. S. COCKERAM, Assistant Examiner
U.S. Cl. X.R.
117—155; 260—2.5, 29.1, 56, 77.5